US012697817B2

(12) United States Patent
Suzuki

(10) Patent No.: US 12,697,817 B2
(45) Date of Patent: Aug. 4, 2026

(54) LIQUID CONTAINER, INK CARTRIDGE, AND LIQUID DISCHARGE APPARATUS

(71) Applicant: Hideaki Suzuki, Kanagawa (JP)

(72) Inventor: Hideaki Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 173 days.

(21) Appl. No.: 18/604,522

(22) Filed: Mar. 14, 2024

(65) Prior Publication Data

US 2024/0326455 A1     Oct. 3, 2024

(30) Foreign Application Priority Data

Mar. 29, 2023     (JP) .................................. 2023-053195

(51) Int. Cl.
*B41J 2/175*     (2006.01)
*B41J 2/17*      (2006.01)
*G01F 23/00*     (2022.01)

(52) U.S. Cl.
CPC ...... B41J 2/17513 (2013.01); G01F 23/0007 (2013.01); *B41J 2/1707* (2013.01)

(58) Field of Classification Search
CPC .. B41J 2/17513; B41J 2/1707; B41J 2/17546; B41J 2/17553; B41J 2/17566; G01F 23/0007; G01F 23/02
USPC ......................................................... 347/86
See application file for complete search history.

(56) References Cited

U.S. PATENT DOCUMENTS

| | | | |
|---|---|---|---|
| 2004/0017451 A1* | 1/2004 | Takabayashi ........ | B41J 2/17509 347/100 |
| 2012/0006225 A1* | 1/2012 | Tsukiana ................ | C09D 11/38 106/31.86 |
| 2019/0016147 A1* | 1/2019 | Naito ........................ | B41J 29/13 |
| 2019/0232668 A1* | 8/2019 | Suzuki ................... | B41J 2/1755 |

FOREIGN PATENT DOCUMENTS

| | | |
|---|---|---|
| JP | 2012-139850 A | 7/2012 |
| JP | 2012-139851 A | 7/2012 |
| JP | 2012-139852 A | 7/2012 |
| JP | 2013-173288 A | 9/2013 |
| JP | 2020-082692 A | 6/2020 |

* cited by examiner

*Primary Examiner* — Jason S Uhlenhake
*Assistant Examiner* — Alexander D Shenderov
(74) *Attorney, Agent, or Firm* — XSENSUS LLP

(57)     ABSTRACT

A liquid container includes a first liquid container to contain a first liquid and a second liquid container disposed on one side of the first liquid container in the longitudinal direction. The second liquid container contains a second liquid different from the first liquid. The second liquid container includes a transparent part visible from the outside of the second liquid container and a scale inside the second liquid container. The scale is visible from the outside through the transparent part.

7 Claims, 5 Drawing Sheets

LIQUID CONTAINER, INK CARTRIDGE, AND LIQUID DISCHARGE APPARATUS

CROSS-REFERENCE TO RELATED APPLICATION

This patent application is based on and claims priority pursuant to 35 U.S.C. § 119 (a) to Japanese Patent Application No. 2023-053195, filed on Mar. 29, 2023, in the Japan Patent Office, the entire disclosure of which is hereby incorporated by reference herein.

BACKGROUND

Technical Field

Embodiments of the present disclosure relate to a liquid container, an ink cartridge, and a liquid discharge apparatus.

Related Art

When an ink cartridge that serves as a liquid container to contain ink as liquid is left in substantially the same posture for a long time, a sediment may be accumulated in a lower portion of the ink cartridge and the condition of the ink in the ink cartridge may be deteriorated.

To deal with such an issue, an operation in which the ink cartridge is shaken manually by an operator to stir ink in the ink cartridge has been performed. However, there is no measure as to how much the ink cartridge should be shaken in the operation of stirring the ink. For this reason, how much the ink cartridge should be shaken in the operation of stirring the ink varies depending on the operator. Accordingly, the ink may not be sufficiently stirred.

By contrast, an ink cartridge is known that includes permanent magnets inside the ink cartridge, a coil disposed along a path in which the permanent magnets move, a power generation unit, and a power storage unit. When the ink cartridge is stirred, the power generation unit generates electric power by electromagnetic induction caused by relative movement between the permanent magnets and the coil, and the electric power is stored in the power storage unit. The electric power of the electric storage unit is detected. By so doing, data regarding the frequency and degree in which the ink in the ink cartridge is stirred can be acquired.

SUMMARY

In an embodiment of the present disclosure, a liquid container includes a first liquid container to contain a first liquid and a second liquid container disposed on one side of the first liquid container in the longitudinal direction. The second liquid container contains a second liquid different from the first liquid. The second liquid container includes a transparent part visible from the outside of the second liquid container and a scale inside the second liquid container. The scale is visible from the outside through the transparent part.

In another embodiment of the present disclosure, a liquid discharge apparatus includes the ink container attachably detachable from the liquid discharge apparatus and a liquid discharge head to discharge the first liquid supplied from the liquid container.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
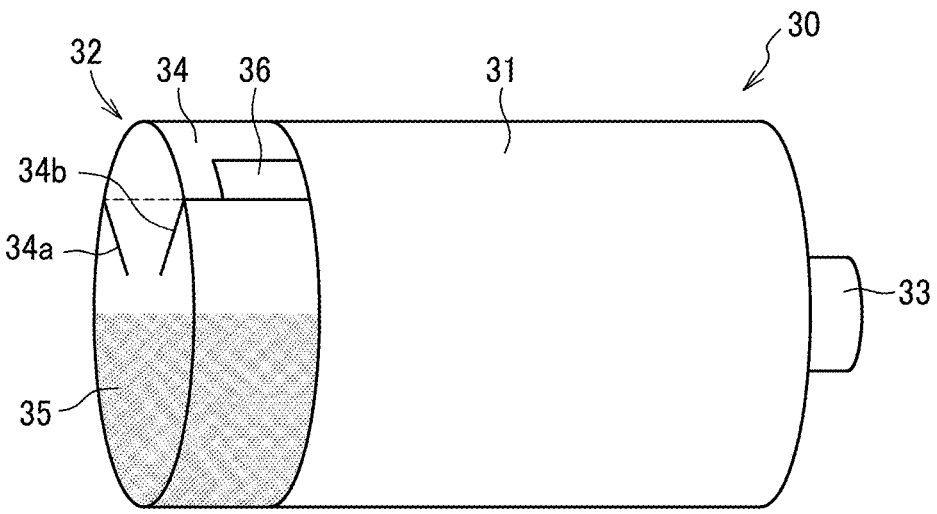
FIG. 1 is a perspective view of an ink cartridge according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described with reference to the drawings in the following description. In the drawings, like reference signs denote like or equivalent components and overlapping description of those components may be simplified or omitted as appropriate.

A description is now given of an ink cartridge as a liquid container for containing toner as a first liquid below. However, the first liquid contained in the ink cartridge may be, for example, a pretreatment liquid. In embodiments of the present disclosure, an ink cartridge that contains the first liquid discharged from a liquid discharge apparatus is referred to as an ink cartridge for the sake of convenience.

As illustrated in FIG. 1, an ink cartridge 30 that serves as a liquid container includes an ink container 31 as a first liquid container for containing ink as a first liquid inside the ink container 31, and a second liquid container 32 for containing oil 35 as a second liquid. The second liquid is employed to check the degree in which the first liquid is stirred in the ink container 31 during a stirring operation, as described below.

The ink container 31 includes an ink supply port 33 on one end of the ink container 31 in the longitudinal direction. The ink container 31 supplies ink to the liquid discharge apparatus via the ink supply port 33. In the present embodiment, the ink container 31 has a cylindrical shape.

The second liquid container 32 is disposed on the other side of the ink container 31 in the longitudinal direction. The second liquid container 32 includes a transparent containing portion 34, the oil 35 contained in the containing portion 34, and a sensor 36 as a sensor.

Figure 2:
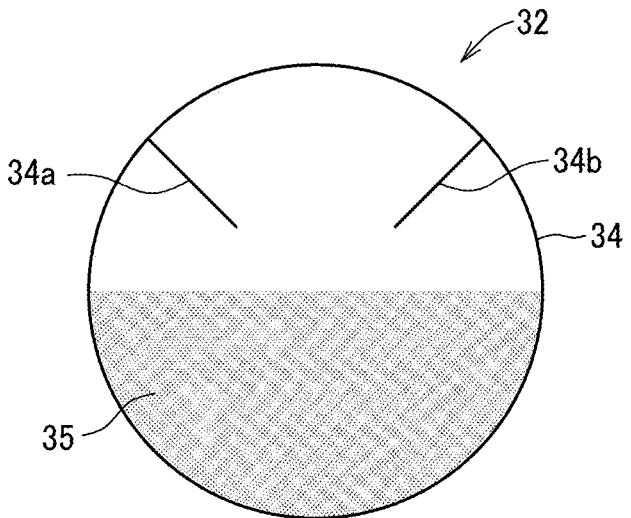
FIG. 2 is a cross-sectional view of the ink cartridge of FIG. 1.

The containing portion 34 of the present embodiment has a cylindrical shape. The containing portion 34 is partitioned from the ink container 31 to contain the second liquid. The containing portion 34 includes scales 34a and 34b at predetermined positions in the circumferential direction of the containing portion 34. The scales 34a and 34b serve as scales for checking the position of the liquid surface of the oil 35 in the containing portion 34. As illustrated in FIG. 2, the scales 34a and 34b are disposed at positions symmetrical with respect to the center line of the containing portion 34 in the vertical direction, i.e., the center line in the vertical direction in FIG. 2. The containing portion 34 is formed with a transparent material such that the oil 35 and the scales 34a and 34b inside the containing portion 34 are visible from the outside.

The sensor 36 is disposed at the position of the scale 34b. The sensor 36 serves as a sensor for detecting whether the oil 35 has reached the position of the scale 34b of the containing portion 34. In other words, the sensor 36 can detect whether the position of the liquid surface of the oil 35 is lower or higher than the position of the scale 34b. The sensor 36 may serve as a sensor to detect, for example, whether the oil 35 contacts the sensor 36 when the oil 35 contacts the sensor 36 to turn on the switch of the sensor 36. In the present embodiment, the sensor 36 is disposed at the position of the scale 34b. However, the sensor 36 may be disposed at the position of the scale 34a or may be disposed at both of the positions of the scales 34a and 34b.

Figure 3:
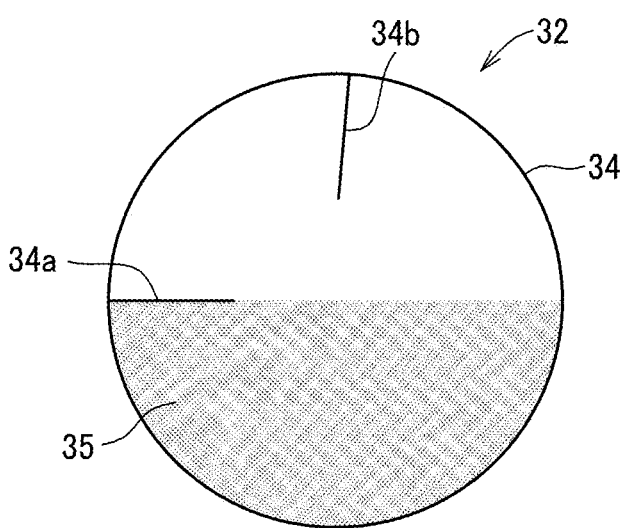
FIG. 3 is a cross-sectional view of the ink cartridge of FIG. 1, when the ink cartridge is inclined to one side in the circumferential direction of the ink cartridge.
Figure 4:
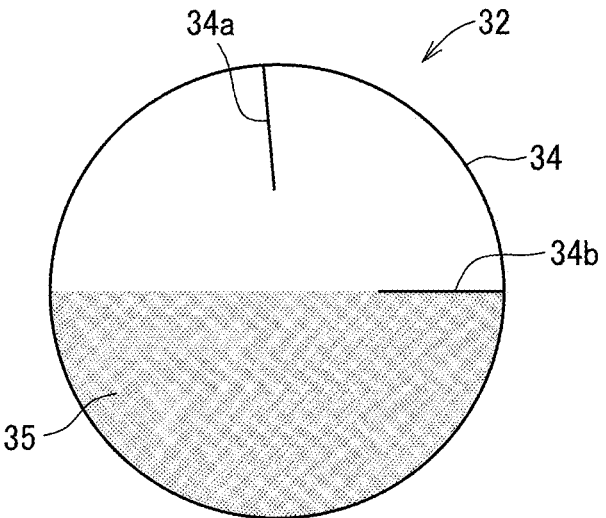
FIG. 4 is a cross-sectional view of the ink cartridge of FIG. 1, when the ink cartridge is inclined to the other side in the circumferential direction of the ink cartridge.

The ink cartridge 30 of the present embodiment is tilted to the left and right as illustrated in FIGS. 3 and 4, respectively, with the ink cartridge 30 taken out from the body of the liquid discharge apparatus. Accordingly, the ink inside the ink cartridge 30 is stirred. In so doing, sediment can be prevented from being generated in ink in the ink cartridge 30 and the sediment in the ink can be stirred. However, the liquid discharge apparatus may be tilted to the left and right to stir the ink in the liquid discharge apparatus.

When the ink is stirred, the position of the liquid surface of the oil 35 in the transparent containing portion 34 and the scales 34a and 34b are checked. Thus, the position of the liquid surface of the oil 35 and the scales 34a and 34b can be employed as guides while the ink is stirred. In other words, as illustrated in FIG. 3 or 4, the oil 35 is stirred until the position of the liquid surface of the oil 35 in the containing portion 34 reaches the scales 34a and 34b. By so doing, the oil 35 in the containing portion 34 can be sufficiently stirred. As described above, in the ink cartridge 30 of the present embodiment, the oil 35 and the scales 34a and 34b are employed as the guides for the stirring operation. Accordingly, the degree in which the oil 35 in the containing portion 34 is stirred can be visually checked during the stirring operation. Thus, the oil 35 in the containing portion 34 can be sufficiently stirred. In addition, such an effect as described above can be achieved without using a permanent magnet. For this reason, no disadvantage may occur even when a circuit board that detects whether ink runs out is disposed in the ink cartridge 30 or ink that contains magnetic material is employed.

A lower face of the containing portion 34, particularly, a portion of the circumferential surface of the containing portion 34 between the scales 34a and 34b is formed in a partially circular shape. By so doing, the ink cartridge 30 can be tilted smoothly. However, an upper face of the containing portion 34 may have a shape as needed.

In addition, disposing the sensor 36 in the ink cartridge 30 allows the frequency of the stirring operation to be detected. When the frequency of the stirring operation is low, an alert that notifies the frequency of the stirring operation is low is sent to an operator to prompt to perform the stirring operation. A lighting lamp may be disposed in the ink cartridge 30 as such a notification device. In addition, when the ink cartridge 30 is mounted on the liquid discharge apparatus, data on the frequency of the stirring operation may be transmitted to a controller of the liquid discharge apparatus, and an alert to prompt to perform the stirring operation may be displayed on a display unit of the liquid discharge apparatus.

The oil 35 is employed as the second liquid. By so doing, the amount of the oil 35 in the containing portion 34 can be prevented from decreasing due to evaporation of the oil 35, and the visibility of the inside of the containing portion 34 can be prevented from being reduced due to water droplets adhering to the inner face of the containing portion 34. Accordingly, the accuracy of measuring the degree in which the ink is stirred using the oil 35 and the scales 34a and 34b as the guides for the stirring operation is less likely to vary.

In particular, the oil 35 preferably has a viscosity of equal to or smaller than 2.42 mm2/s. The above-described value is the upper limit of a viscosity grade (VG 2) of the International Organization for Standardization (ISO) for industrial lubricants specified in Japanese Industrial Standards (JIS) K 2001:1993. Setting the viscosity of the oil 35 to the above-described value allows the oil 35 to be likely to follow and move in accordance with the stirring of the ink when the ink cartridge is tilted. Accordingly, the accuracy of measuring the degree in which the ink is stirred using the oil 35 and the scales 34a and 34b as the guides for the stirring operation is enhanced.

The above-described configuration of the ink cartridge 30 of the present embodiment is particularly suitable for a case in which a white ink is employed as the first liquid. In other words, sediment is likely to generate in the white ink. For this reason, the configuration of the ink cartridge 30 of the present embodiment allows the stirring operation to be appropriately performed. Accordingly, generation of the sediment can be reduced.

Figure 5:
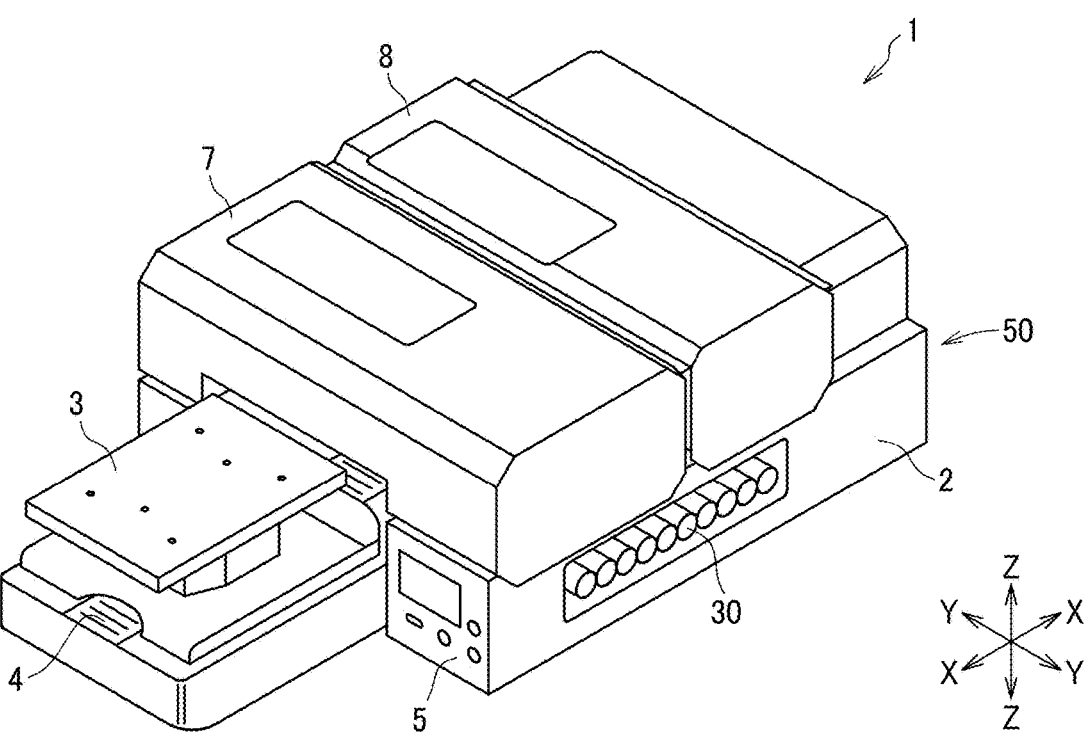
FIG. 5 is a perspective view of a liquid discharge apparatus with covers closed, according to an embodiment of the present disclosure.
Figure 6:
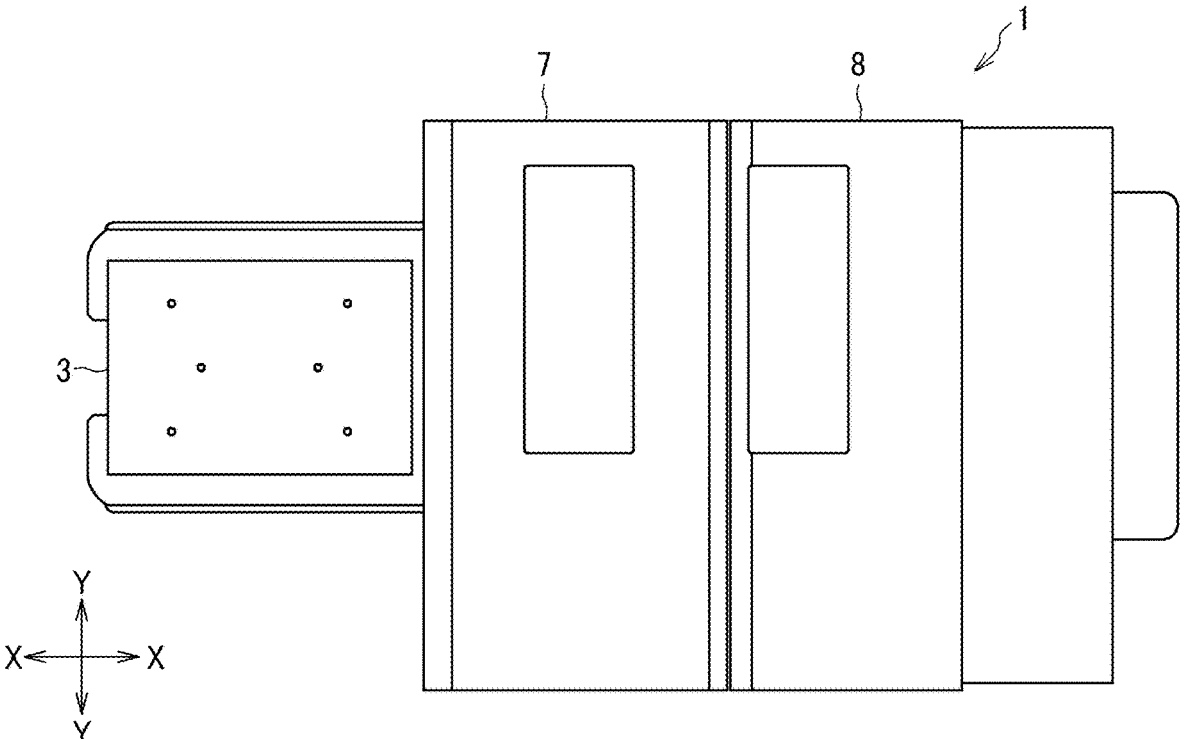
FIG. 6 is a plan view of the liquid discharge apparatus of FIG. 5 with the covers opened.
Figure 7:
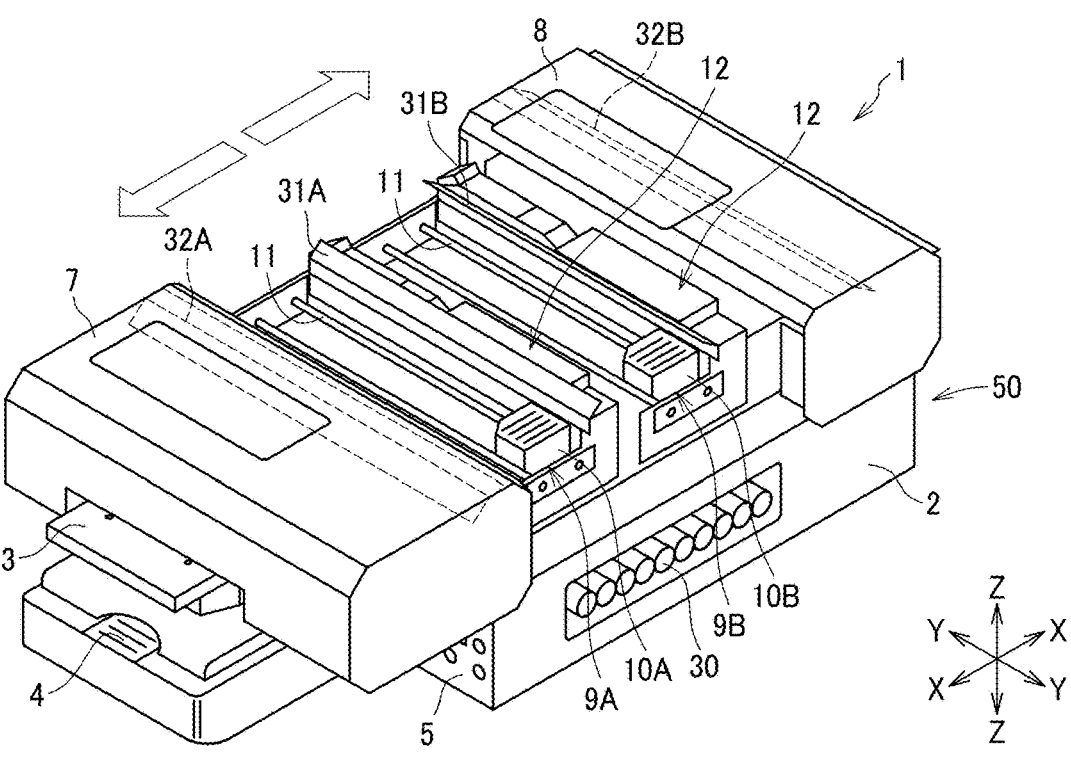
FIG. 7 is a perspective view of the liquid discharge apparatus of FIG. 5 with the covers opened.
Figure 8:
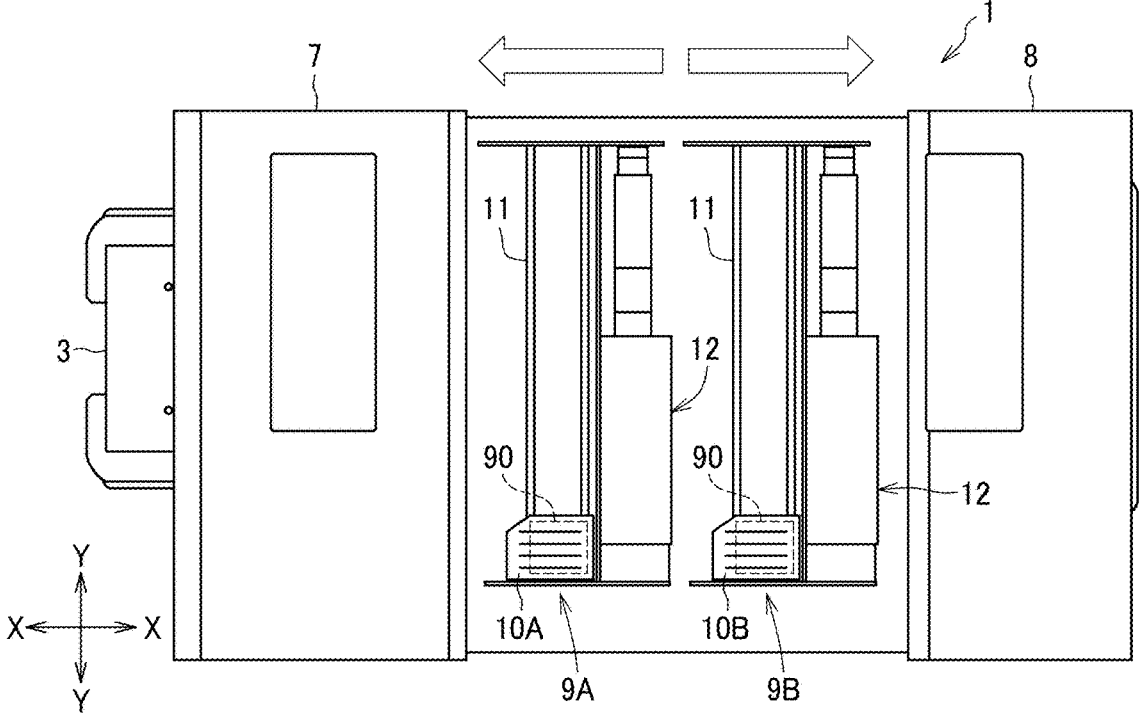
FIG. 8 is a plan view of the liquid discharge apparatus of FIG. 5 with the covers opened.

Subsequently, a liquid discharge apparatus 1 to which the ink cartridge 30 of the above-described embodiments is attachable and detachable from is described with reference to FIGS. 5, 6, 7, and 8. FIG. 5 is a perspective view of the liquid discharge apparatus 1 with a front cover 7 and a rear cover 8 closed, according to an embodiment of the present disclosure. FIG. 6 is a plan view of the liquid discharge apparatus 1. FIG. 7 is a perspective view of the liquid discharge apparatus 1 with the front cover 7 and the rear cover 8 opened. FIG. 8 is a plan view of the liquid discharge apparatus 1 with the front cover 7 and the rear cover 8 opened. In FIG. 5, a direction indicated by double-headed arrow X is a front-rear direction, a sub-scanning direction, or a recording medium conveyance direction of the liquid discharge apparatus 1. A direction indicated by double-headed arrow Y is a width direction or a main-scanning direction of the liquid discharge apparatus 1. A direction indicated by double-headed arrow Z is a vertical direction of the liquid discharge apparatus 1. The X and Y directions are parallel to a surface of a recording medium onto which the liquid is discharged, placed on a stage of the liquid discharge apparatus 1. However, the X and Y directions may not be fully parallel to the surface of the recording medium. The directions X, Y, and Z are orthogonal to each other.

As illustrated in FIGS. 5 and 6, the liquid discharge apparatus 1 includes a stage 3 in front of a housing 2. The stage 3 is disposed above a guide rail 4. The guide rail 4 extends in the X direction. An operation panel 5 is disposed on a front side of the housing 2. The ink cartridges 30 are detachably attached to a side surface of the housing 2. In each of the ink cartridges 30 mounted in the housing 2, the second liquid container 32 in FIG. 1 faces the outside of the liquid discharge apparatus 1, and the ink supply port 33 is disposed inside the liquid discharge apparatus 1. The front cover 7 and the rear cover 8 that serve as covers are disposed on the housing 2. The liquid discharge apparatus 1 discharges ink onto a fabric as a recording medium.

An upper surface of the stage 3 is a surface on which a recording medium is placed and is flat. The upper surface of the stage 3 is a surface parallel to the X direction and the Y direction. The stage 3 is movable above the guide rail 4 and reciprocally movable in both directions of the X direction. In addition, the stage 3 is movable up and down in both directions of the Z direction. Accordingly, the height of the recording medium placed on the stage 3 can be adjusted.

The front cover 7 and the rear cover 8 are movable in both directions of the X direction. In FIG. 5, the front cover 7 is moved rearward and the rear cover 8 is moved forward with both the front cover 7 and the rear cover 8 closed. By contrast, in FIG. 7, the front cover 7 is moved forward and the rear cover 8 is moved rearward with both the front cover 7 and the rear cover 8 opened. Such a configuration as described above in which the front cover 7 and the rear cover 8 are slidable horizontally to be opened and closed can reduce a footprint of the liquid discharge apparatus 1 including areas in which the front cover 7 and the rear cover 8 are opened and closed, compared with, for example, a configuration in which the front cover 7 and the rear cover 8 are opened and closed vertically. The front cover 7 and the rear cover 8 each includes openings at both ends of the front cover 7 and the rear cover 8 in the front-rear direction. When the front cover 7 and the rear cover 8 are closed, the front cover 7 and the rear cover 8 are arranged sequentially in the front-rear direction.

As illustrated in FIGS. 7 and 8, an apparatus body 50 of the liquid discharge apparatus 1 includes the housing 2, liquid dischargers 9A and 9B disposed on the housing 2. In the present embodiment, in particular, the apparatus body 50 is a portion of the liquid discharge apparatus 1, other than the front cover 7 and the rear cover 8. The front cover 7 and the rear cover 8 are slidable in the X direction with respect to the apparatus body 50.

When the front cover 7 and the rear cover 8 are opened, the liquid discharger 9A and the liquid discharger 9B in the liquid discharge apparatus 1 are exposed to the outside. Exposing the liquid discharger 9A and the liquid discharger 9B to the outside allows maintenance units 90, liquid discharge heads, peripheral components of the liquid discharge heads to be cleaned, or carriages to be replaced. While an image formation is performed, the front cover 7 and the rear cover 8 are closed. Accordingly, the liquid discharger 9A and the liquid discharger 9B are covered by the front cover 7 and the rear cover 8, respectively, and moving components such as the carriages of the liquid discharger 9A and the liquid discharger 9B may not be accessed from the outside. The liquid dischargers 9A and 9B are each arranged in a space closed by the front cover 7 and the rear cover 8, respectively. By so doing, ink mist is prevented from scattering outside the liquid discharge apparatus 1 while the liquid is discharged. At the same time, airflows are circulated in the front cover 7 and in the rear cover 8 by fans disposed in the liquid discharger 9A and the liquid discharger 9B. Accordingly, the generated ink mist is circulated in the front cover 7 and the rear cover 8 to be collected.

The liquid discharge apparatus 1 of the present embodiment includes two liquid dischargers, the liquid discharger 9A and the liquid discharger 9B arranged in the X direction. The liquid discharger 9A discharges color ink and white color ink. The liquid discharger 9B discharges a pretreatment liquid. The liquid discharged by the liquid discharger 9A and the liquid discharger 9B is not limited to the above-described ink or liquid. However, the liquid discharged by the liquid discharger 9A and the liquid discharger 9B may be any liquid of color ink, white color ink, and pretreatment liquid. In particular, when the recording medium is a fabric, preferably, the pretreatment liquid is applied to the recording medium before an image is formed with ink on the recording medium. For this reason, preferably, either one of the liquid discharger 9A or the liquid discharger 9B discharges the pretreatment liquid.

The liquid discharger 9A and the liquid discharger 9B have a similar configuration. Accordingly, the liquid discharger 9A is described below. The liquid discharge unit 9A includes a carriage 10A, a guide rod 11, an electrical unit 12 including, for example, a circuit board, an electrical cover, and a maintenance unit 90. The liquid discharger 9A and the liquid discharger 9B may also be referred to simply as liquid discharger 9. The carriages 10A and 10B may also be referred to simply as a carriage 10.

The guide rod 11 extends in the main-scanning direction. The carriage 10 is movable in the main-scanning direction along the guide rod 11. The carriage 10 includes multiple liquid discharge heads. The maintenance unit 90 is disposed at a position facing the guide rod 11 and on one side of the guide rod 11 in the left-right direction outside an area in which the liquid is discharged.

The maintenance unit 90 includes, for example, a wiper to clean nozzle surfaces of the liquid discharge heads and a suction mechanism to suck the nozzle surfaces. The wiper may be a wiper made of, for example, rubber, or may be a web made of, for example, nonwoven fabric.

A process in which an image is formed on a recording medium by the above-described liquid discharge heads is described below.

First, a recording medium is placed on the stage 3 and conveyed above the guide rail 4. Then, the recording medium is conveyed to the rear side of the liquid discharge apparatus 1, and the liquid discharger 9B applies the pretreatment liquid to the recording medium. Specifically, the pretreatment liquid is discharged from nozzles disposed on the liquid discharge heads to the recording medium in the main-scanning direction while the carriage 10B is moved along the guide rod 11 in the main-scanning direction. Repeating the above-described operation at positions of the recording medium in the sub-scanning direction allows the pretreatment liquid to be applied to the recording medium. Subsequently, the stage 3 is moved to the front side of the liquid discharge apparatus 1, and the liquid discharger 9A discharges liquids of multiple colors to the recording medium in a similar manner. When white color is printed on a recording medium, for example, white color ink is discharged by the liquid discharger 9A. Subsequently, the stage 3 is moved to the rear side of the liquid discharger 9A again, and the white color ink is discharged to the recording medium by the liquid discharger 9A. In so doing, an image can be formed on the recording medium.

Figure 9:
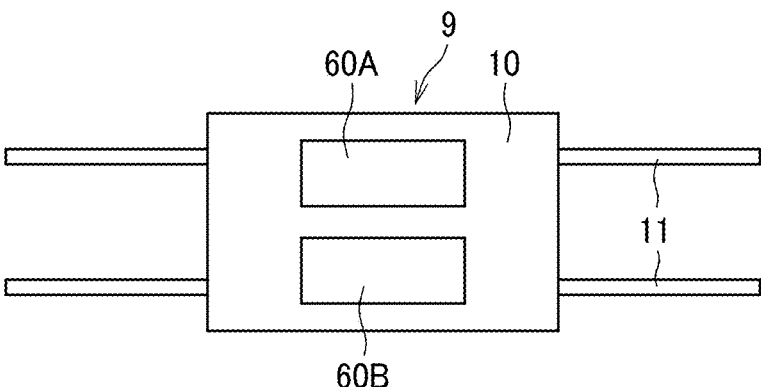
FIG. 9 is a diagram illustrating a carriage in which two liquid discharge head units are disposed, according to an embodiment of the present disclosure.

As illustrated in FIG. 9, the carriage 10 may include multiple liquid discharge head units, a liquid discharge head unit 60A in the rear side of the carriage 10 (the upper side of FIG. 9) and a liquid discharge head unit 60B in the front side of the carriage 10 (the lower side of FIG. 9). In the above-described configuration, for example, the pretreatment liquid is discharged by the liquid discharge head unit 60A, and the white or color ink is discharged by the liquid discharge head unit 60B. The multiple liquid discharge head units 60A and 60B may be a single liquid discharge head.

The ink cartridge 30 of the present embodiment can be employed for the liquid discharge apparatus 1 described above. Accordingly, the degree in which the ink is stirred can be checked during the stirring operation. For this reason, the stirring operation can be sufficiently performed. Accordingly, the ink that has been sufficiently stirred and is in a good condition can be discharged from the liquid discharge apparatus 1.

Embodiments of the present disclosure have been described as above. However, embodiments of the present disclosure are not limited to the embodiments described above, and various modifications and enhancements are possible without departing from the gist of the present disclosure.

The liquid container in embodiments of the present disclosure is not limited to the ink cartridge 30 containing the ink described above. For example, the liquid container according to the above embodiments of the present disclosure may be applied to a toner cartridge that is detachably attached to an electrophotographic image forming apparatus. The second liquid is not limited to oil, and any liquid as appropriate can be employed. The first liquid and the second liquid are each contained in different portions of the liquid container, i.e., the ink container 31 and the second liquid container 32, respectively. The first liquid and the second liquid are not necessarily different in the composition of the liquid.

In embodiments of the present disclosure, the liquid to be discharged is not limited to a particular liquid as long as the liquid has a viscosity or surface tension to be discharged from liquid discharge head. However, preferably, the viscosity of the liquid is not greater than 30 mPa·s under ordinary temperature and ordinary pressure or by heating or cooling. More specifically, examples of the liquid include a solution, a suspension, or an emulsion that contains, for example, a solvent such as water and an organic solvent, a colorant such as dye and pigment, a functional material such as a polymerizable compound, a resin, and a surfactant, a biocompatible material such as deoxyribonucleic acid (DNA), amino acid, protein, and calcium, or an edible material such as a natural colorant. Such a solution, a suspension, and an emulsion are employed for, for example, inkjet ink, a surface treatment solution, liquid for forming components of an electronic element and a light-emitting element or a resist pattern of an electronic circuit, or a material solution for three-dimensional fabrication.

The liquid includes not only ink but also paint, pretreatment liquid, binder, and overcoat liquid.

In embodiments of the present disclosure, the term "liquid discharge apparatus" is an apparatus which includes a mist collection member or carriages including liquid discharge heads and drives the liquid discharge heads to discharge liquid. The term "liquid discharge apparatus" includes, in addition to apparatuses to discharge liquid to a recording medium to which the liquid can adhere, apparatuses to discharge liquid into gas (air) or liquid.

The "liquid discharge apparatus" may include devices to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

Examples of the liquid discharge apparatus include an image forming apparatus which is an apparatus that forms an image on a sheet by discharging ink, and a stereoscopic fabrication apparatus, i.e., three-dimensional fabrication apparatus, which discharges fabrication liquid onto a powder layer in which powder is formed in a layer shape to fabricate a stereoscopic fabrication object, i.e., three-dimensional object.

Such liquid discharge apparatus is not limited to an apparatus that discharges liquid to visualize meaningful images, such as letters or figures. For example, the liquid discharge apparatus may be an apparatus that forms meaningless images such as meaningless patterns or an apparatus that fabricates three-dimensional images.

The above-described term "recording medium to which liquid can adhere" denotes, for example, a material or a medium onto which liquid is adhered at least temporarily, a material or a medium onto which liquid is adhered and fixed, or a material or a medium onto which liquid is adhered and into which the liquid permeates. Examples of the "material to which liquid can adhere" include sheets of paper, recording media such as recording sheets, film, and cloth, electronic components such as electronic boards and piezoelectric elements, and media or medium such as powder layers, organ models, and testing cells. The "recording medium onto which liquid can adhere" includes any material on which liquid adheres unless particularly limited.

The above-described recording medium onto which liquid can adhere may be any material as long as liquid can temporarily adhere such as paper, thread, fiber, cloth, leather, metal, plastic, glass, wood, or ceramics.

The liquid discharge apparatus can be an apparatus in which the liquid discharge head and a material to which liquid can adhere move relatively to each other. However, the liquid discharge apparatus is not limited to such an apparatus. Examples of the liquid discharge apparatus include a serial-type apparatus which moves the liquid discharge head, and a line-type apparatus which does not move the liquid discharge head.

Other examples of the liquid discharge device include a treatment liquid application device that discharges treatment liquid to a sheet to apply the treatment liquid to the surface of the sheet for the purpose of modifying the surface of the sheet, and an injection granulation device that injects composition liquid in which a raw material is dispersed in a solution through a nozzle to granulate fine particles of the raw material.

The terms, image formation, recording, printing, image printing, and fabricating employed in embodiments of the present disclosure can be employed synonymously with each other.

Aspects of the present disclosure are, for example, as follows.

First Aspect

A liquid container includes a first liquid container to contain a first liquid and a second liquid container disposed on one side of the first liquid container in the longitudinal direction of the first liquid container. The second liquid container contains a second liquid different from the first liquid. The second liquid container includes a transparent part visible from the outside of the second liquid container and a scale inside the second liquid container. The scale is visible from the outside through the transparent part.

Second Aspect

The liquid container according to the first aspect is an ink cartridge to store ink as the first liquid.

Third Aspect

The liquid container according to the first aspect further includes a sensor to detect the position of the liquid surface of the second liquid in the second liquid container.

Fourth Aspect

In the liquid container according to the second or the third aspect, the second liquid includes oil.

Fifth Aspect

In the liquid container according to the fourth aspect, the viscosity of the oil is equal to or smaller than 2.42 mm$^2$/s.

Sixth Aspect

In the liquid container according to any one of the second to fifth aspects, the first liquid includes white ink.

Seventh Aspect

A liquid discharge apparatus includes the ink container according to any one of the second to sixth aspects, attachably detachable from the liquid discharge apparatus.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A liquid container, comprising:

a first liquid container to contain a first liquid;

a second liquid container on one side of the first liquid container in a longitudinal direction of the first liquid container, wherein the second liquid container contains a second liquid different from the first liquid, and the second liquid container includes:

a transparent part visible from an outside of the second liquid container; and a scale inside the second liquid container, the scale visible from the outside through the transparent part; and a sensor to detect a frequency of a stirring operation of the second liquid in the second liquid container.

2. The liquid container according to claim 1, wherein the liquid container is an ink cartridge to store ink as the first liquid.

3. The liquid container according to claim 2, wherein the first liquid includes white ink.

4. A liquid discharge apparatus, comprising:

the liquid container according to claim 2, wherein the liquid container is attachably detachable from the liquid discharge apparatus; and a liquid discharge head to discharge the first liquid supplied from the liquid container.

5. The liquid container according to claim 1, wherein the sensor detects a position of a liquid surface of the second liquid in the second liquid container.

6. The liquid container according to claim 1, wherein the second liquid includes oil.

7. The liquid container according to claim 6, wherein a viscosity of the oil is equal to or smaller than 2.42 mm$^2$/s.

* * * * *